March 21, 1950     E. M. LAUGHNER     2,501,343
RESISTANCE WELDING APPARATUS
Filed July 26, 1947
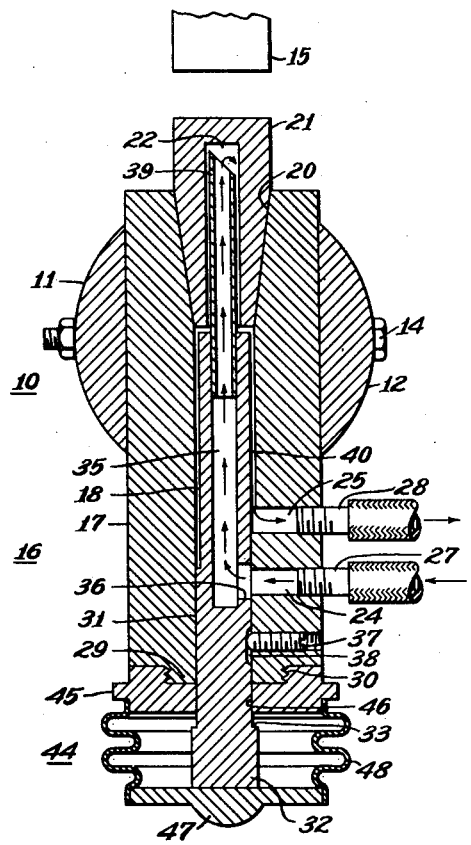
WITNESSES:
Robert C. Baird
F. V. Giolma
INVENTOR
Ernest M. Laughner.
BY G. M. Crawford
ATTORNEY Patented Mar. 21, 1950

2,501,343

UNITED STATES PATENT OFFICE 2,501,343

RESISTANCE WELDING APPARATUS

Ernest M. Laughner, Jeannette, Pa., assignor to Westinghouse Electric Corporation, East Pittsburgh, Pa., a corporation of Pennsylvania Application July 26, 1947, Serial No. 763,785

2 Claims. (Cl. 219—4)

My invention relates, generally, to resistance welding apparatus, and it has reference in particular to resistance welding electrodes and electrode holders for use in resistance welding machines.

Generally stated, it is an object of my invention to provide an improved holder for spot welding electrode tips which is simple and inexpensive to manufacture, and which is both easy to use and reliable in operation.

More specifically, it is an object of my invention to provide a spot welding electrode holder, of the fluid-cooled ejector type, having a flexible seal between the body of the holder and the ejector mechanism.

Another object of my invention is to provide for using a flexible bellows member to seal the ejector mechanism in an electrode holder.

Yet another object of my invention is to provide for using a flexible metal bellows member for positively sealing a movable knockout ram to the body of an electrode holder.

It is also an object of my invention to provide, in a resistance welding electrode holder, a unitary knockout ram and fluid pressure seal.

A further object of my invention is to provide for eliminating the usual source of leaks which occur in spot welding electrode holders of the ejector type.

It is an important object of my invention to provide, in a spot welding electrode holder, for using a movable water tube as a striker for ejecting an electrode tip from the holder.

Other objects will, in part, be obvious and will, in part, be explained hereinafter.

In practicing my invention in one of its forms, the body of an electrode holder comprises a cylinder having a tapered bore at one end for receiving a spot welding electrode tip. Inlet and outlet connections for a cooling fluid are provided through the wall of the cylinder connecting with the bore, and a water tube is positioned in the bore to provide a defined path of flow for the fluid between the inlet and outlet connections. The water tube is movable longitudinally of the bore for engaging the inner end of the electrode tip. A knockout ram is mounted on the end of the body remote from the electrode tip by means of a flexible metal bellows member, which provides a positive fluid seal and permits movement of the ram to actuate the water tube for ejecting the electrode tip.

For a more complete understanding of the nature and scope of my invention, reference may be made to the following detailed description which may be read in connection with the accompanying drawing, in which the single figure is an elevational view in section of a resistance welding electrode showing an electrode holder embodying the invention in one of its forms.

Referring to the drawing, the reference numeral 10 may denote, generally, a resistance welding electrode which may be used with either arm of a resistance welding machine. In this instance it is shown as clamped between the jaws 11 and 12 of the lower arm of a resistance welding machine by clamping means such as the bolt 14, for performing a welding operation in connection with the electrode tip 15 of an electrode which may be similarly secured in the upper arm (not shown) of the welding machine.

The electrode 10 may comprise a holder 16 having a substantially cylindrical body member or barrel 17 with a central longitudinal bore 18 therethrough. The bore may be provided with a tapered surface 20 at the upper end for receiving an electrode tip 21 having a complementary tapered surface and provided with a longitudinal recess 22 open at the lower end for receiving a cooling fluid. Transverse openings 24 and 25 may be provided through the body member 17 into the central bore 18 for receiving inlet and outlet conduit connections 27 and 28 for supplying a suitable cooling fluid to the electrode tip 21. A boss 29 having a threaded shoulder 30 may be attached to the lower end of the body member 17 for securing a fluid under pressure seal to seal the lower end of the bore 18, as will be described more in detail hereinafter.

In order to provide for removing or ejecting the electrode tip 21 from the body member 17 of the holder 16, an ejector mechanism may be provided comprising, for example, an elongated ejector or striker 31 which may be movably positioned within the bore 18 so as to project from the lower end of the body member. The upper end of the striker 31 may be positioned adjacent the inner end of the electrode tip 21 so as to engage it when actuated for ejecting the electrode tip from the body member. The lower end of the striker may be provided with an enlarged head portion 32 having a shoulder 33 for engaging the boss 29 to limit travel of the striker.

In order to provide for directing the flow of a cooling fluid from the inlet connection 27 to the electrode tip 21, the striker 31 may be utilized as a water tube and provided with a longitudinal bore 35 in the upper portion having a transverse opening 36 normally positioned in alignment with the inlet opening 24. Passage for a cooling fluid between the inlet opening 24 and the opening 36 into the central bore of the striker may be assured, either by providing a peripheral groove about the striker 31 in alignment with the inlet opening 24, or by utilizing a set screw 37 in the body member 17 for engaging an elongated axial slot 38 in the striker to maintain the opening 36 in alignment with the inlet opening 24, as shown. An adjustable water tube 39 may be positioned in the central bore 35 of the striker adjacent the upper end so as to project upwardly into the longitudinal recess 22 of the electrode tip 21 for directing the cooling fluid immediately adjacent the working surface of the electrode tip. A return passage 40 for the cooling fluid to the outlet opening 25 may be provided by either making the upper portion of the striker 32 of reduced cross-section, as shown, or by utilizing a suitable length of tubing of less diameter than the body of the striker and suitably secured thereto, whereby an annular passage is provided connecting the recess 22 with the outlet opening 25.

For the purpose of sealing the lower end of the bore 18 to prevent leakage of the cooling fluid therefrom, flexible fluid sealing means designated, generally, by the numeral 44 may be utilized. The sealing means may comprise a nut 45 having a central aperture 46 providing a sliding fit with the lower end of the striker 31, and which is screwed onto the boss 29. A knockout ram 47 may be positioned adjacent the lower end of the striker 31 and disposed to be struck a sharp blow for actuating the striker to remove the electrode tip 21. The knockout ram 47 may be connected to the nut 45 by means of a flexible sealing member such as a diaphragm, or the bellows member 48 which may be soldered, brazed, welded or otherwise secured to the nut and ram. The ram and striker may comprise separate elements as shown, or they may be made integral if desired.

In operation, cooling fluid enters through the inlet conduit 27 and passes through the side opening 36 into the central bore 35 of the striker 31. It then passes through the water tube 39, is directed against the inner end of the recess 22 in the electrode tip 21 and returns by way of the peripheral passage 40 to the outlet conduit 28.

The metal bellows 48 provides a positive seal against leakage of the cooling fluid from the lower end of the holder 16. If it is desired to remove the tip 21 to dress it or replace it, the ram 47 may be struck a sharp blow with a hammer. The striker 31 is actuated thereby to engage the lower end of the tip 21 and eject it from the bore 18. The bellows member 48 permits movement of the ram and striker while maintaining a positive fluid seal.

From the above description and the accompanying drawing, it will be apparent that I have provided an improved resistance welding electrode holder which is simple and inexpensive to manufacture and which is easy to use and to maintain. By utilizing a metal bellows member, or the like, for sealing the ejector mechanism, no leaks will result due to wear of the movable striker as a result of use. The flexible seal provided in accordance with my invention is permanent and requires no continued adjustments to maintain the seal leakproof. Since the water seal and the knockout ram may comprise a unitary assembly, replacements may be easily and inexpensively made.

Since certain changes may be made in the above-described construction and different embodiments of the invention may be made, without departing from the spirit or scope of the invention, it is intended that all the matter contained in the above description and shown in the accompanying drawing shall be considered as illustrative and not in a limiting sense.

I claim as my invention:

1. In an electrode tip holder, an elongated conductive body member having a longitudinal bore with a tapered seat at one end to receive a removable electrode tip, conduit means providing inlet and outlet connections with the bore for a cooling fluid, a striker movably disposed in the bore, said striker having an opening therethrough at one end communicating with one of the conduit means to direct the cooling fluid and projecting from the body member at the other end, a ram disposed to engage the projecting end of the striker, and a single resilient metal bellows member connecting the ram to the body member.

2. An electrode comprising, an elongated conductive body member having a longitudinal bore with a tapered portion at one end and a threaded shoulder at the other end, conduit means providing inlet and outlet connections for passing a fluid through the bore, an electrode tip seated in the tapered portion of the bore and having a recess in its inner end, a water tube including a one-piece striker member movably positioned in the bore to engage the inner end of the electrode and projecting from the other end of the body member, said striker member having an axial bore opening at the end adjacent the electrode and connecting with one of the conduit means, and a resilient seal consisting of a single metal bellows member having a ram at one end to engage the projecting end of the striker and a threaded bushing at the other end disposed to engage the threaded shoulder of the body member.

ERNEST M. LAUGHNER.

REFERENCES CITED

The following references are of record in the file of this patent:

UNITED STATES PATENTS

| Number | Name | Date |
|---|---|---|
| 2,385,108 | Seeloff | Sept. 18, 1945 |

FOREIGN PATENTS

| Number | Country | Date |
|---|---|---|
| 567,387 | Great Britain | Feb. 12, 1945 |